US011741295B2

(12) United States Patent
Peng et al.

(10) Patent No.: US 11,741,295 B2
(45) Date of Patent: Aug. 29, 2023

(54) INDEPENDENT RENDERING ENGINE FOR A USER INTERFACE INTERNATIONALIZATION

(71) Applicant: VMware, Inc., Palo Alto, CA (US)

(72) Inventors: Rongbo Peng, Atlanta, GA (US); Yifei Li, Beijing (CN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/166,599

(22) Filed: Feb. 3, 2021

(65) Prior Publication Data

US 2022/0215157 A1 Jul. 7, 2022

(30) Foreign Application Priority Data

Jan. 7, 2021 (WO) ................ PCT/CN2021/070596

(51) Int. Cl.
*G06F 40/166* (2020.01)
*G06F 9/451* (2018.01)
*G06F 40/263* (2020.01)
*G06F 40/143* (2020.01)

(52) U.S. Cl.
CPC ............ *G06F 40/166* (2020.01); *G06F 9/454* (2018.02); *G06F 40/143* (2020.01); *G06F 40/263* (2020.01)

(58) Field of Classification Search
CPC .... G06F 40/166; G06F 40/263; G06F 40/143; G06F 9/454
See application file for complete search history.

(56) References Cited

U.S. PATENT DOCUMENTS

| 2004/0056894 A1* | 3/2004 | Zaika ..................... G06F 9/454 715/762 |
| 2007/0288853 A1* | 12/2007 | Neil ..................... G06F 40/143 715/760 |
| 2009/0282333 A1* | 11/2009 | Olsen ................... G06F 40/186 715/703 |
| 2011/0209047 A1* | 8/2011 | Olsen ................... G06F 40/143 715/234 |
| 2015/0039287 A1* | 2/2015 | Han ........................ G06F 40/58 704/2 |

* cited by examiner

*Primary Examiner* — Keith D Bloomquist
(74) *Attorney, Agent, or Firm* — Clayton, McKay & Bailey, PC

(57) ABSTRACT

Methods and systems are disclosed for an independent internationalization ("i18n") engine for loading language content into a Domestic Object Model ("DOM"). An application can receive a markup file. The markup file can include language markers and an object map. The object map can map the language markers to language content in a language library. The application can construct a DOM from the markup file. An i18n engine of the application can retrieve language content from the language library using the object map. The i18n engine can insert the language content into objects in the DOM according to their corresponding language markers. The application can display the markup file using the DOM with the included language content.

18 Claims, 5 Drawing Sheets

INDEPENDENT RENDERING ENGINE FOR A USER INTERFACE INTERNATIONALIZATION

This application claims priority to PCT Application no. PCT/CN2021/070596, titled "INDEPENDENT RENDERING ENGINE FOR A USER INTERFACE INTERNATIONALIZATION," filed Jan. 7, 2021, which is hereby incorporated by reference in its entirety.

BACKGROUND

With the software market growing more and more beyond the English-speaking world, software needs to support various text and data formats to reach non-English speaking customers. The process of designing software for different languages and regions is called internationalization ("i18n").

The current i18n methods are time consuming and difficult to carry out. For example, current i18n implementation happens in the data object layer. This means the i18n implementation is integrated into the application's business logic. This causes the localized values to be used as the basis for logical judgments made in rendering the user interface. As a result, if a localized value changes, that can cause some features and functionalities to break. Because the localized values are integrated into the business logic, it can be difficult to identify what caused the break. Additionally, changes to the i18n are hard to implement because different i18n definitions can exist throughout the business logic, making it difficult to ensure the proper changes have been made. A change can also cause unexpected conflicts with the existing business logic, leading to additional breakage. Companies can spend considerable time and money just on i18n functional testing for a single product release.

As a result, a need exists for implementing i18n of software independent of the software's business logic.

SUMMARY

Examples described herein include systems and methods for providing language content in an application. The examples can include an application, such as a web browser, that includes an i18n engine or module that is responsible for adding language content into a Document Object Model ("DOM").

In an example, an application can receive a markup file for displaying content. In one example the application can be a web browser. In another example, the markup file can be a Hypertext Markup Language ("HTML") file, an Extensible Hypertext Markup Language ("XHTML") file, an ("XML") Extensible Markup Language file, or a configuration file. The file can have language markers. A language marker can be an element or text in the file that indicates where language content should be inserted. In one example, the language marker can be an HTML custom data attribute.

In an example, a rendering engine in the application can construct a DOM from the file. The DOM can be an object-oriented programming interface that defines the logical structure, such as a logical tree, of the file. The DOM can be organized by objects, and each object can represent an element in the file that can be manipulated, such as a properties, methods, and events. In one example, objects in the DOM that call for language content can include a language marker.

In an example, an i18n engine in the application can determine target locale settings of the application. Some examples of target local settings can include the language, date and time format, number format, and currency format.

In an example, the i18n engine can retrieve language content in the determined language that corresponds to the language markers. In one example, the file can include an object map. The object map can include mappings for language markers to corresponding language content. In one example, the language content can be stored in language libraries. The i18n engine can use the object map to retrieve the appropriate language content. In an example, the i18n engine can insert the language content into objects according to their corresponding language markers. The rendering engine can then display the content on a display.

In one example, the i18n engine can monitor the DOM for any changes. For example, the i18n engine can subscribed to certain events in the application related to the DOM. If a DOM element changes, the i18n engine can determine whether new language content needs to be retrieved. For example, the i18n engine can determine whether the change to the object includes a new language marker. If so, the i18n engine can retrieve language content corresponding to the new language marker using the object map.

In an example, a user can change the language setting in the browser. In response, the i18n engine can map the language markers to language content in a language library for the new language. The i18n engine can replace all the language content in the DOM with the language content in the new language.

In an example, the application can send the DOM and object map to a testing service. The testing service can include a testing i18n engine that loads language content into the DOM using the object map and language markers. The i18n engine can load language content into the DOM for each available language of the application. The testing service can analyze each object to determine whether any issues arise because of the different languages being inserted into the DOM, such as formatting issues where the text of one language is too long for a provided window size or areas. Where an issue does arise, the testing service can notify a user.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompany- Methods and systems are disclosed for an independent i18n engine for loading language content into a DOM. The i18 definitions can be separated from the business logic by using language markers that are translated for display in a user interface layer, in an example.

An application can receive a markup file that contains language for displaying content, such as an HTML file, an XHTML file, an XML file, or a configuration file. The file can include language markers and an object map. The object map can map the language markers to language content in a language library. The application can construct a DOM from the markup file. An i18n engine of the application can retrieve language content from the language library using the object map. The i18n engine can insert the language content into objects in the DOM according to their corresponding language markers. The application can display the HTML file using the DOM with the included language content.

The examples described herein reference HTML and web browsers, but these are merely examples and are not meant to be limiting in any way. The examples described herein can be applicable to other object-based applications. As some examples, references to HTML files can include XML files, XHTML files, and configuration files, and references to a web browser can apply to other applications that can read HTML, XML, XHTML, or other markup languages. "Application" and "web browser" are used interchangeably throughout and can refer to an application that can display content using the methods described herein. Likewise, "HTML" and "file" are used interchangeably throughout and can refer to a file that contains information for displaying content.

Figure 1:
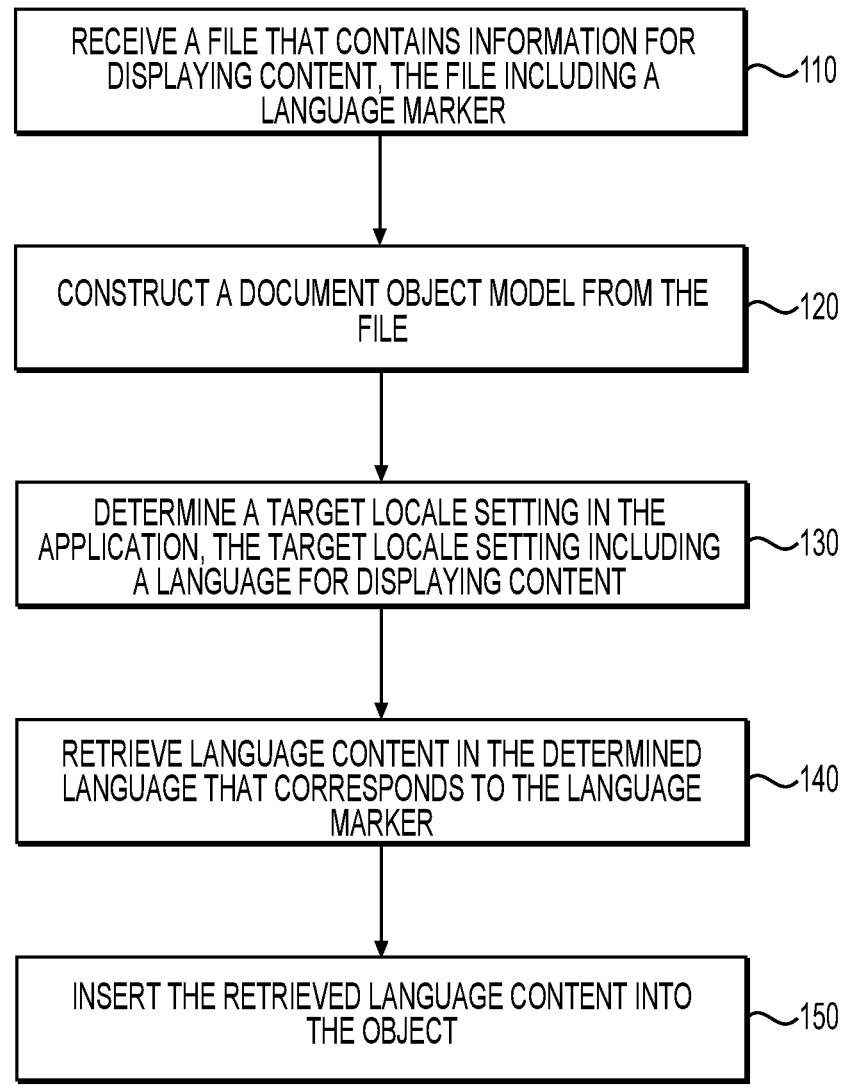
FIG. 1 is a flowchart of an example method for providing language content in an application.

FIG. 1 is a flowchart of an example method for providing language content in an application. At stage 110, an application can receive a file that contains information for displaying content, such as an HTML document. In an example, the application can be a web browser that accesses content on the internet. In an example, the application can be installed on a user device, such as a personal computer, tablet, or cell phone. The web browser can include various components that process content received from the internet and present the content on a display. For example, a networking component can be responsible for making network calls, such as Hypertext Transfer Protocol ("HTTP") requests. A rendering engine can transform received content, such as HTML documents, into an interactive visual display (i.e., a "web page") on the user device. A user interface ("UP") can provide portions of the browser display aside from the main window where the requested content is displayed, such as the address bar, bookmarking menu, refresh button, browser extensions, and back/forward buttons. The UI can communicate with a UI backend to draw basic widgets, such as windows and combo boxes. The web browser can store various types of data, such as cookies, in a persistence layer. A JavaScript interpreter can parse and execute JavaScript code embedded in the HTML of a website.

The HMTL document can be received in response to a request initiated by a user. For example, a user can enter a Uniform Resource Locator ("URL") into the search bar of the web browser or click on a link with an embedded URL. The user action can cause the web browser to send a request for content from a web server associated with the URL. The web server can respond to the request by providing the HTML document. The HTML document can be any document designed to be displayed in a web browser using markup language.

In an example, the HTML document can include language markers. A language marker can be an element or text in the HTML document that indicates where certain language content should be inserted. In one example, the language markers can be custom data attributes. Custom data attributes are part of the HTML5 standard that allow extra information to be stored in HTML elements. This extra information is not initially displayed on a rendered web page, but it often can be retrieved later to be presented dynamically. For example, in HTML5, custom attributes can follow the syntax of "data-*" where "*" represents a customizable attribute name.

In one example, the language markers can be mapped to language content in a language library. For example, instead of language content for the web page, the HTML document can include custom data attributes that have language markers. As explained in further detail in the stages below, the web browser can retrieve language content mapped to the language markers as a way of loading language content for the web page.

The following is an example of an HTML element that includes a custom data attribute as a placeholder:

<li data-name="value"></li>

In this example, <li data-i18n="title"> is the start tag, "data-" indicated a custom data attribute, "name" is the data attribute name, "value" is the data attribute value, and </li> is the end tag. Content is notably missing between the start tag and end tag. In an example, the web browser can map the custom data attribute to the appropriate language content. In an example, the data attribute name can indicate that the custom data attribute is acting as a language placeholder, and the data attribute value can be mapped to the appropriate language content.

At stage 120, the rendering engine can construct a DOM of the file. A DOM is an object-oriented programming interface that defines the logical structure, such as a logical tree, of an HTML document. The DOM can be organized by objects, where each object represents an element in the HTML document that can be manipulated, such as a properties, methods, and events. The DOM can allow JavaScript code embedded in the HTML document to dynamically modify a web page rendered by the HTML document. For example, JavaScript code can manipulate the DOM to add, remove, or change HTML elements and attributes, change Cascading Style Sheets ("CSS") styling, and create events.

By using language markers in the HTML document, the rendering engine can build the DOM without language content. When created this way, the DOM as initially created can act as a shell or a template. This can allow the web browser to render the website without any language content if no language content is inserted. Because no language content is included during DOM construction, the DOM can be constructed significantly faster.

At stage 130, an i18n engine can determine a language setting for the application. The i18n engine can be a software component of the web browser responsible for implementing target locale settings into the DOM. In one example, the i18n engine can be a module of the web browser. Some examples of target local settings can include the language, date and time format, number format, and currency format. In one example, the target locale settings can be saved in the storage component of the web browser. In an alternative example, the HTML document can indicate default locale settings.

At stage 140, the i18n engine can retrieve language content in the determining language that corresponds to the language marker. In some examples, the i18n engine can have access to, or receive with the HTML document, one or multiple language libraries. Each language library can store language content for a specific language, such as English, Spanish, Chinese, or Russian. The language libraries can be stored as part of the web browser or in another location on the computing device that executes the web browser. Alternatively, the language libraries can be stored on and retrieved from a web server, such as on a database server.

In an example, the language markers can be mapped to language content in the language libraries. In one example, mappings can be stored in a mapping table that maps the language markers to language content. In another example, the mapping table can include multiple entries for each language marker, and each of the multiple entries can map to a different language for the language marker. For example, a marker can be mapped to a text value in an English library, a Spanish library, a Chinese library, and a Russian library. The i18n engine can use the language setting to determine which language library to map the marker to. After the rendering engine creates the DOM, the i18n engine can retrieve the appropriate language content using the mappings and insert the language content into their corresponding language markers.

In one example, the language libraries can store language content specific to the HTML document. For example, a developer can create the HTML document for a web page with language markers instead of language content. The developer can construct the language libraries with the language content and map the language markers to their corresponding content. When a web browser receives the HTML document, the browser can retrieve the language library for the web page that corresponds to the browser's language setting. In a user selects a different language, the web browser can download the language library for the web page in the selected language. In an alternate example, the language libraries for all available languages can be sent with the HTML document to allow a quicker transition between languages.

At stage 150, the i18n engine can insert the retrieved language content into the DOM. For example, the i18n engine can retrieve language content mapped from a language marker. In one example, the i18n engine can replace the marker with the language content. Alternatively, the i18n engine can insert the language content into the object but keep the language marker in the object. This can allow the i18n engine to more easily change the language content if, for example, the language settings change.

In one example, inserting language content can include formatting content according to the target locale settings. For example, date values can be stored separately by day, month, and year as opposed to a complete date, or as a single value that can be formatted into a variety of date formats. This can allow the i18n engine to retrieve the date values and format them according to the browser's region settings before inserting them into the language markers. As an example, the DOM for a web page can include a date element. Where the web browser is set for English in the United States, the i18n engine can insert the date values in a mm/dd/yy format, but where the web browser is set for English in the United Kingdom, the i18n engine can insert the same values in a dd/mm/yy format.

In an example that uses custom data attributes previously described, a web browser receives an HTML document that includes custom data attributes as language placeholders. The custom data attributes are in the form previously described: <li data-name="value"></li>. The rendering engine constructs a DOM of the HTML document. One object in the DOM includes a custom data attribute that reads <li data-i18n="title"></li>. The i18n engine can identify the custom data attribute as a language marker by its name: "data-i18n." The i18n engine can map the value, "title," to language content in a language library that reads "This is the title." The i18n engine can insert the text into the custom data attribute so that it now reads <li data-i18n="title"> This is the title</li>.

Figure 2:
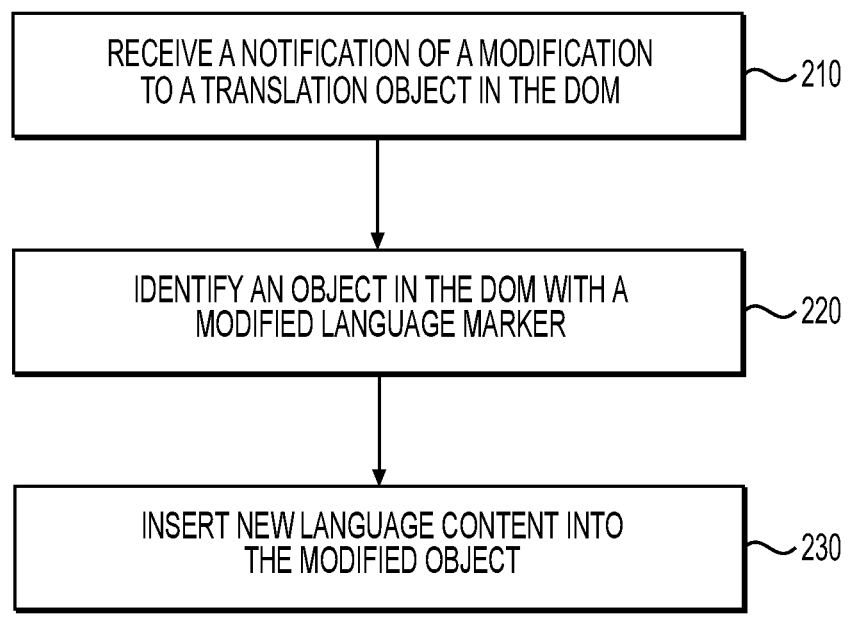
FIG. 2 is another flowchart of an example method for updating language content in an application.

FIG. 2 is another flowchart of an example method for updating language content in an application. At stage 210, the i18n engine can receive a notification of a modification to an object in the DOM. For example, the i18n engine can be subscribed to any DOM modification events. After the rendering engine modifies or adds a DOM object, the rendering engine can publish this event. As some examples, the rendering engine can publish DOM modifications using a publish-subscribe pattern, a message queue model, or another similar inter-process communication method. The i18n engine can be notified of the event by the inter-process communication method used by the browser.

At stage 220, the i18n engine can retrieve new language content corresponding to the modified object. For example, an event can cause the rendering engine or the JavaScript engine to change the value of the language marker in an object. The i18n engine can analyze the modified object to detect the change and then map the new language marker to its corresponding language content in the language libraries. In an example where the rendering engine adds a new object to the DOM, the i18n engine can simply map the language marker in the new object to the language libraries. In an example where an object is modified but there are no changes to any language markers, the i18n engine can take no responsive action. At stage 230, the i18n engine can insert the new language content into the modified or new object.

The following is an example JavaScript code snippet that uses jQuery that can cause the i18n engine to monitor and update changes to DOM objects:

```
1.   Message = I18N.Object.extend({
2.     key: null,
3.     source: null,
4.     arguments: null,
5.     language: I18N.getCurrentLanguage( ),
6.     value: I18N.computed('key', 'arguments', 'language',
            function ( ) {
7.
8.         return I18N.getTranslationHandler(this.get('language'))
9.            (this.get('key'), this.get('arguments'));
10.    }),
11.
12.    valueChange: I18N.observer('value', function ( ) {
13.       console.log("This value is changed");
14.    })
15.  });
16.
17.  DateFormat = I18N.Object.extend({
18.    data: null,
19.    pattern: null,
20.    locale: I18N.getCurrentLocale( ),
21.    value: I18N.computed(data', 'pattern', 'locale', function ( ) {
22.
23.       return I18N.getDateFormatHandler(this.get('locale'))
24.          (this.get('data'), this.get('pattern'));
25.    }),
26.
27.    valueChange:I18Nobserver('value', function ( ) {
28.       console.log("This value is changed");
29.    })
```

```
    -continued
30.    });
31.
32.
33.    var dateformat = DateFormat.create({
34.      pattern: 'date.formats.short',
35.      data: 1251862029000
36.    });
37.
38.
39.    var message = Message.create({
40.      key: 'title',
41.      source: 'Hello, {0}',
42.      arguments: ['World'],
43.    });
```

Lines 1-15 of this example use a jQuery extend( ) method to replace language content when it detects a modification of an object. The language extend( ) method includes an observer at lines 12-13 that detects when a message console appears in a console for the corresponding parameters indicating that a value has changed. When the observer detects that value change, the script uses the parameters at lines 39-42 to replace the language content in the object.

Lines 17-30 use a jQuery extend method( ) for date formatting that operates in a similar manner as the extend( ) method for language content. Lines 17-30 monitor the console for an event that indicates a change in the target locale. Where the target locale is changed, the parameters from lines 33-35 can be used to change the date format according to the new target locale.

Figure 3:
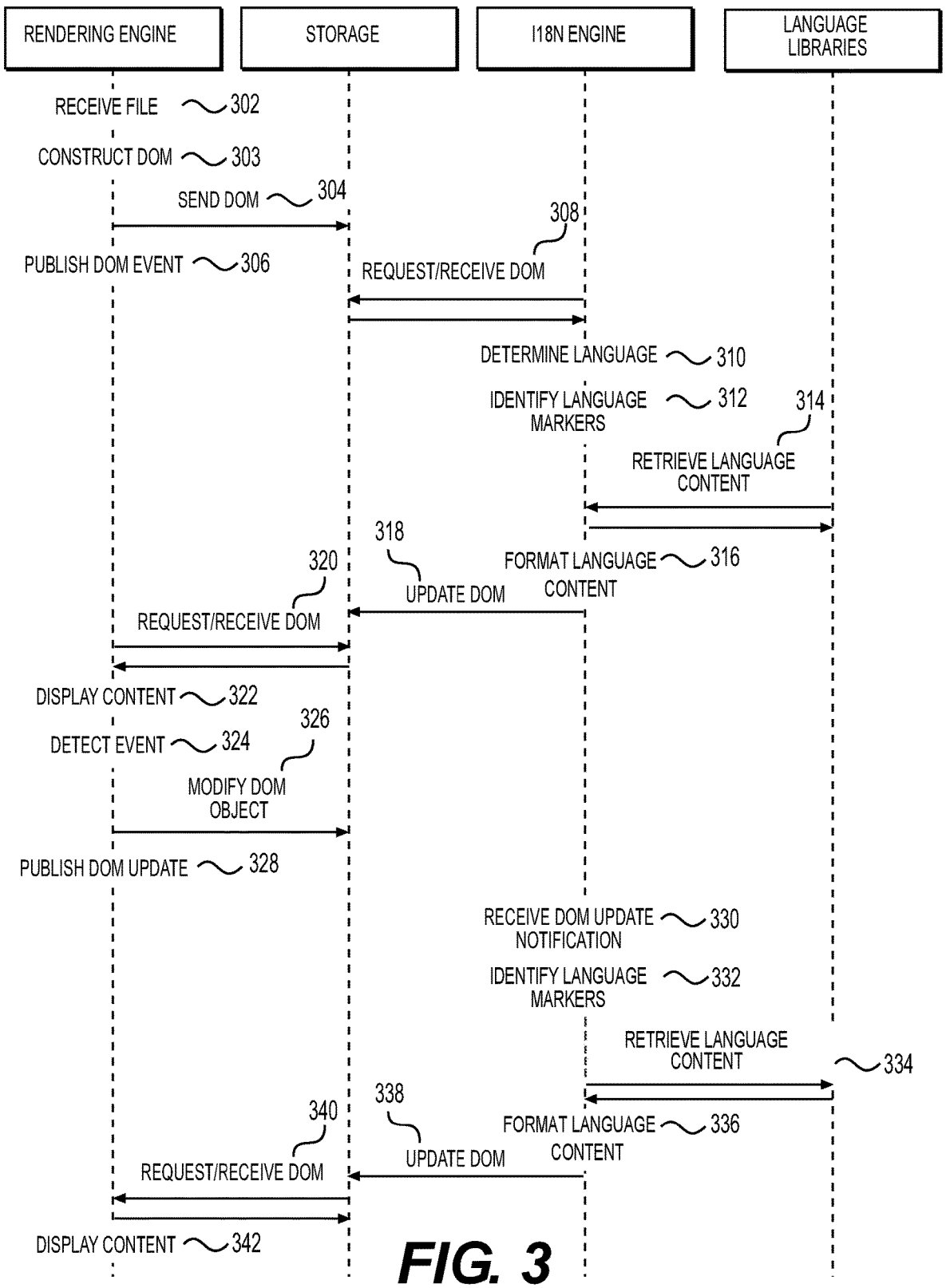
FIG. 3 is a sequence diagram of an example method for providing language content in an application.

FIG. 3 is a sequence diagram of an example method for providing language content in an application. At stage 302, a rendering engine in a web browser can receive an HTML document. The HTML document can be any document designed to be displayed in a web browser using markup language. In an example, the HTML document can include language markers. A language marker can be an entry or text in the HTML document that indicates where certain language content should be inserted. As an example, the language markers can be custom data attributes.

At stage 303, the rendering engine can construct a DOM of the HTML document. The DOM can include language placeholders in the objects without language content. Once the DOM is constructed, the rendering engine can store the DOM in a storage component at stage 304. Some examples of a storage component can include a persistence layer in the web browser or a memory in the user device.

At stage 306, the rendering engine can publish an event signifying that it created the DOM. As an example, the browser can implement an inter-process communication method whereby components of the browser can be notified when another component performs certain actions. In an example, the i18n engine can be subscribed to any DOM modification events. When the rendering engine makes a change to an object in the DOM, the i18n can then be notified.

At stage 308, an i18n engine can retrieve the DOM from the storage. While in one example the i18n engine can retrieve the DOM, alternatively the i18n engine can access the DOM in the storage component. For example, the i18n engine can have read/write access to the DOM once it is saved to the storage component. Once the i18n engine is notified that the DOM has been created, the i18n engine can read and update the DOM while it is in the storage component.

At stage 310, the i18n engine can determine a language setting for the web browser. The language setting can indicate a language that content should be displayed in, such as English, Spanish, Chinese, or Russian. In one example, the i18n engine can also retrieve locale settings for the web browser. The locale settings can inform which language to use in translating the language markers of the DOM. Some examples of locale settings can include the language, date and time format, number format, and currency format. Some examples of locales can include the United States and the United Kingdom. Although both the United States and the United Kingdom use English, the two regions use difference date formats.

At stage 312, the i18n engine can identify language markers in the DOM. In an example, language markers can be elements in the DOM that include predetermined text that the i18n engine is configured to identify as a language marker. In one example, the language markers can be custom data attributes. As an example, the i18n engine can be configured to identify custom data attributes that include "data-name" as the attribute name. For example, a custom data attribute can read <li data-i18n="value"></li> where "value" is the data attribute value. The i18n engine can identify any custom data attribute named "data-i18n" as a language marker.

At stage 314, the i18n engine can map language content in a language library to the DOM. As an example, the i18n engine can have access to, or receive with the HTML document, one or more language libraries. A language library can store the language content for the HTML document. In one example, the language content for all languages can be stored in a single storage library. Alternatively, the language content can be stored in a separate library for each language.

In an example, the language markers can map to language content in the language library. Using the custom data attribute example above, the "value" field can map to language content. For example, a custom data attribute that reads <li data-i18n="title"></li> can map to text in the language library corresponding to the word "title."

At stage 316, the i18n engine can format the language content. Formatting the language content can include applying locale settings. As an example, a language marker calls for the date Aug. 27, 2020. Where the locale settings are for the United States, the i18n engine can format the date as Aug. 27, 2020, but where the locale settings are for the United Kingdom, the i18n engine can format the date as 27 Aug. 2020.

At stage 318, the i18n engine can update the DOM. Updating the DOM can include inserting the language content into the DOM. Continuing the custom data attribute language above, the i18n engine can map the custom data attribute with the value "title" to language content in the language library that reads "This is the title." The i18n engine can insert the text from the language library into the custom data attribute so that it reads <li data-i18n="title"> This is the title</li>.

At stage 320, the rendering engine can retrieve the DOM. In one example, the i18n engine can publish an event that it updated the DOM. The rendering engine can be subscribed to such an event. Upon being notified of the update, the rendering engine can retrieve, or in some examples simply access, the DOM in the storage component.

At stage 322, the rendering engine can display content using the DOM. For example, the rendering engine can be responsible for rendering the DOM as a web page on a display. The rendering engine can construct the DOM and wait for the i18n to publish an event that the language content has been added. The rendering engine can then render the content in the DOM into a UI.

While a user is interacting with a web page, the user can perform certain actions that cause the rendering engine to modify the DOM. For example, web pages using JavaScript can respond to user input, such as selections, text input, or mouse movements, by updating elements or objects on the web page. Stages 324-342 illustrate an example of how the web browser with an i18n engine can dynamically update language content according to such events.

At stage 324, the rendering engine can detect an event. In an example, a user can perform an action on the web page that triggers a change to the web page. As some examples, a user can click on a button that causes a new object to be presented or select to change the language content is displayed in. In an example, the HTML document can include portions of JavaScript that respond to such user action and execute a change to the DOM.

At stage 326, the rendering engine can modify a DOM object based on the event. Modifying a DOM object can include examples like adding a new object or changing content within an object. In one example, the modification can include modifying or replacing a language marker in a DOM object. As an example, a language marker in a DOM object includes a custom data attribute that reads <li data-i18n="para1"> This is the content</li>. The user event triggers an event that requires language content from a different language marker for the DOM object, so the rendering engine replaces the custom data attribute with <li data-i18n="para2"></li>. The new custom data attribute includes the language marker "data-i18n='para2'" that points to the now needed language content, but it does not include the language content itself.

At stage 328, the rendering engine can publish DOM modification. This can occur in a similar manner to stage 306 above. The rendering engine can publish an event about the modification. At stage 330, the i18n engine can receive a notification of the DOM modification. For example, like stage 306 above, the i18n engine can be subscribed to DOM modification events. In one example, the i18n engine can run a script that constantly monitors for any DOM changes. For example, the i18n engine can actively monitor and update objects using the methods and script described above regarding FIG. 2.

At stage 332, the i18n engine can identify the object in the DOM that was modified. In one example, the notification at stage 330 can indicate which object was modified. In another example, the i18n engine can run an observer script that detects when an object is modified. In one example, the i18n engine can determine whether any new language content is required. For example, an object can be modified in a way that does not require any new language content, such as a styling change. In such examples, the i18n engine need not taken any further action.

At stage 334, the i18n engine can map language content to the modified object. This can include identifying any new language markers. Continuing the custom data attribute example from stage 326 above, the i18n engine can identify <li data-i18n="para2"></li> as a new language marker. The i18n engine can identify the language marker based on the custom data attribute name, "data-i18n," and map "para2" to its corresponding text.

At stage 336, the i18n engine can format the language content. Like stage 316 above, this can include accounting for any locale settings that may apply, such as dates and number formats.

At stage 338, the i18n engine can update the DOM. This can include inserting mapped language from new language markers. Continuing the custom data attribute marker, the "para2" value can map to text that reads "This is the updated text." The i18n engine can insert this text into the custom data attribute so that it reads <li data-i18n="para2"> This is the updated text. </li>.

Stages 340 and 342 can be performed like stages 320 and 322. At stage 340, the rendering engine can retrieve the DOM. For example, the i18n engine can publish an event that it updated the DOM with the language content. Upon being notified of the update, the rendering engine can retrieve, or in some examples simply access, the DOM in the storage component. At stage 342, the rendering engine can display content using the updated DOM. In an example, this can include only changing the modified objects on the web page.

In one example of the above described method, at stage 324 a user can select to change the language of the language content. For example, a user can select to change the language from English to Spanish. In one such example, the rendering engine can change the language setting of the browser. However, because a user may only wish to change the language on a single web page and not all pages, in one example the rendering engine can send an update just for the web page. In one such example, the rendering engine can publish an event about the language change. The i18n engine can be subscribed to such a change. Upon being notified, the i18n engine can proceed to update the DOM with language content in the selected language. This can include using language marker mappings to retrieve language content from the language library in the selected language and inserting the language content in their corresponding objects.

Figure 4:
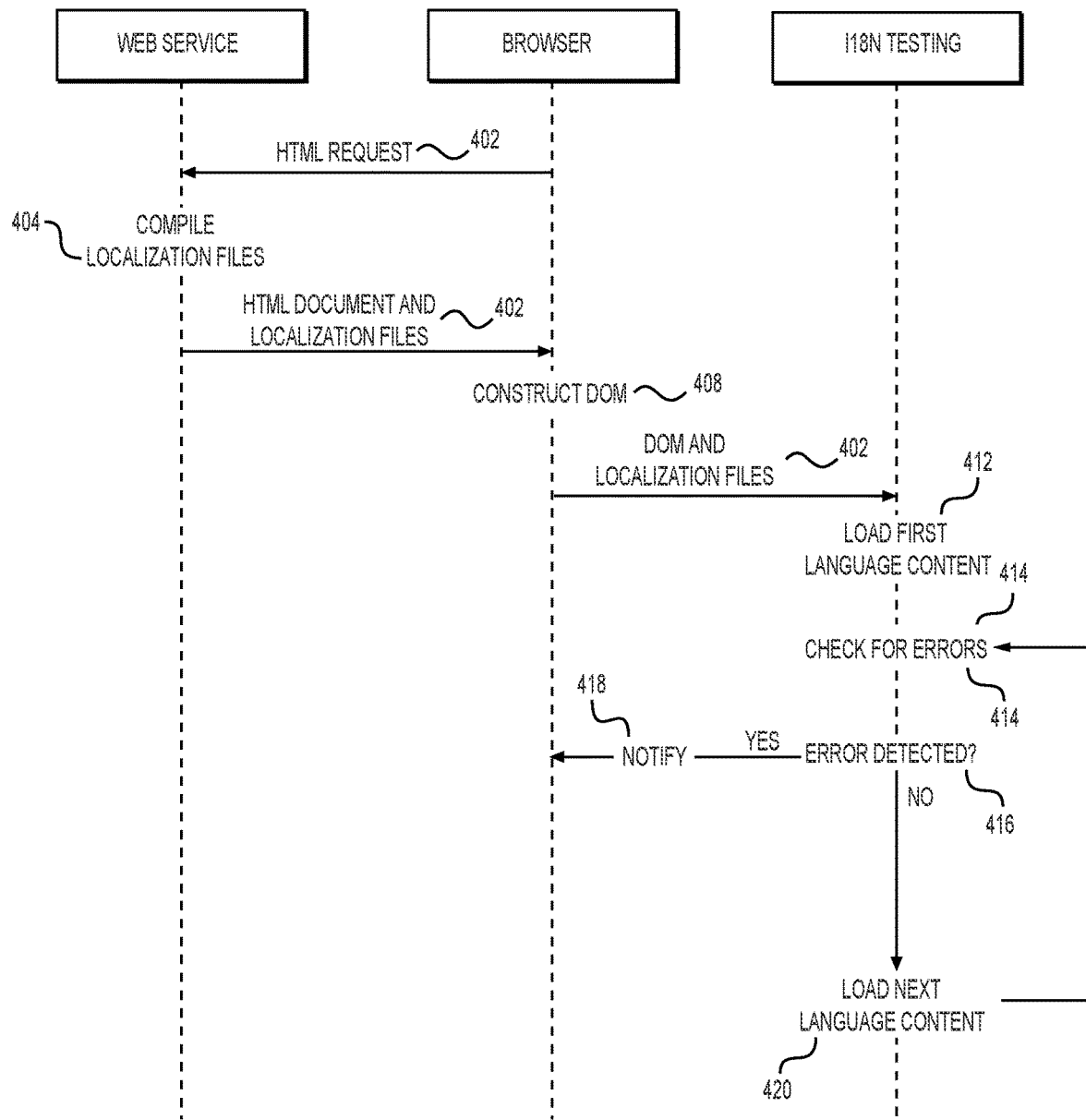
FIG. 4 is a sequence diagram of an example method for i18n testing of an application.

FIG. 4 is a sequence diagram of an example method for i18n testing of an application. In an example, this example method can be used as part of the i18n process to design a web page or application for different languages and regions. At stage 402, the browser can send an HTTP request to a web service. For example, a user can insert a URL into the browser or click on a link that initiates an HTTP request for a new web page.

Upon receiving the HTTP request, at stage 404 the web service can compile localization files. Some examples of localization content can include language content and target locale settings. In an example, the HTML document can include language markers. A language marker can be an entry or text in the HTML document that indicates where certain language content should be inserted. In one example, the language markers can be custom data attributes. In an example, the HTTP request can be associated with an HTML document for a web page. The web service can compile language content for each available language for the web page. In one example, to limit resource usage, the HTTP request can specify target locale settings for the web browser. The web service can then compile localization content associated with the target locale. If the user changes the target locale while interacting with the web page, the browser can send an additional HTTP request for the localization content of the new target locale. At stage 406, the web service can send the HTML document and the localization files to the browser.

At stage 408, the browser can construct a DOM based on the HTML document. This can include parsing any HTML, CSS, and JavaScript in the HTML document. In an example, the DOM can be constructed as a logical tree.

At stage 410, the browser can send the DOM and the localization files to an i18n testing service. The browser can also send metadata to the i18n engine in an example. Metadata can include information like browser information, web page resolution, and cookies. In one example, the i18n testing service can be part of the browser. In another example, the i18n engine can be an application, such as a web application. As an example, a user can navigate to a URL for the testing web application in the web browser. Within the testing application, the user can provide the URL for the web page to be tested. The browser can send the request and receive the corresponding localization content and HTML document. The testing application can construct the DOM without needing to send it to another device or application.

At stage 412, the i18n testing service can load language content of a first language into the DOM. In an example, this can include using mappings in the localization content that indicate where language content should be loaded. The i18n testing service can use the mappings to locate and insert the language content for each language marker in the DOM.

At stage 414, the i18n service can check for errors. This can include, for example, determining where text does not fit properly in a window or button. Because the localization content is loaded as its own layer, the testing does not need to include testing the source locale to ensure that the interface between core functions and the i18n engine work well. Instead, the i18n testing service need only test whether the output matches what is expected.

At stage 416, the method can depend on whether an error is detected. For example, if an error is detected, at stage 418 the i18n testing service can notify the browser. In one example, the i18n testing service can present the web page on a display of the user device. Where any errors occur, the testing service can highlight areas that require adjustments. In another example, the i18n testing service can notify the user which object has the error.

At stage 420, where no error is detected, or alternatively where the user selects another language, the i18n engine can load the language content for the next language. For example, the i18n testing engine can execute a code that causes the browser to replace the language content in the DOM with language content in the next language. The method can then return to stage 414 where the i18n testing service checks for errors. The i18n testing engine can continue checking for errors for each available language or for each language the user selects. In one example, the i18n testing service can load each language sequentially and generate a report of all errors. The i18n testing service can send the report to the user, such as with an email or notification. The report can indicate which objects resulted in an error. In one example, the report can include links or another method that allows the user to pull up the web page with the errors highlighted so the user can see the errors.

In the example method described above, because the language content is loaded as its own layer and only relies on the original DOM, the language content is not tied up in the business logic of the web page or application. This means the web page or application can be tested without risking build failures that are difficult to identify and fix.

Figure 5:
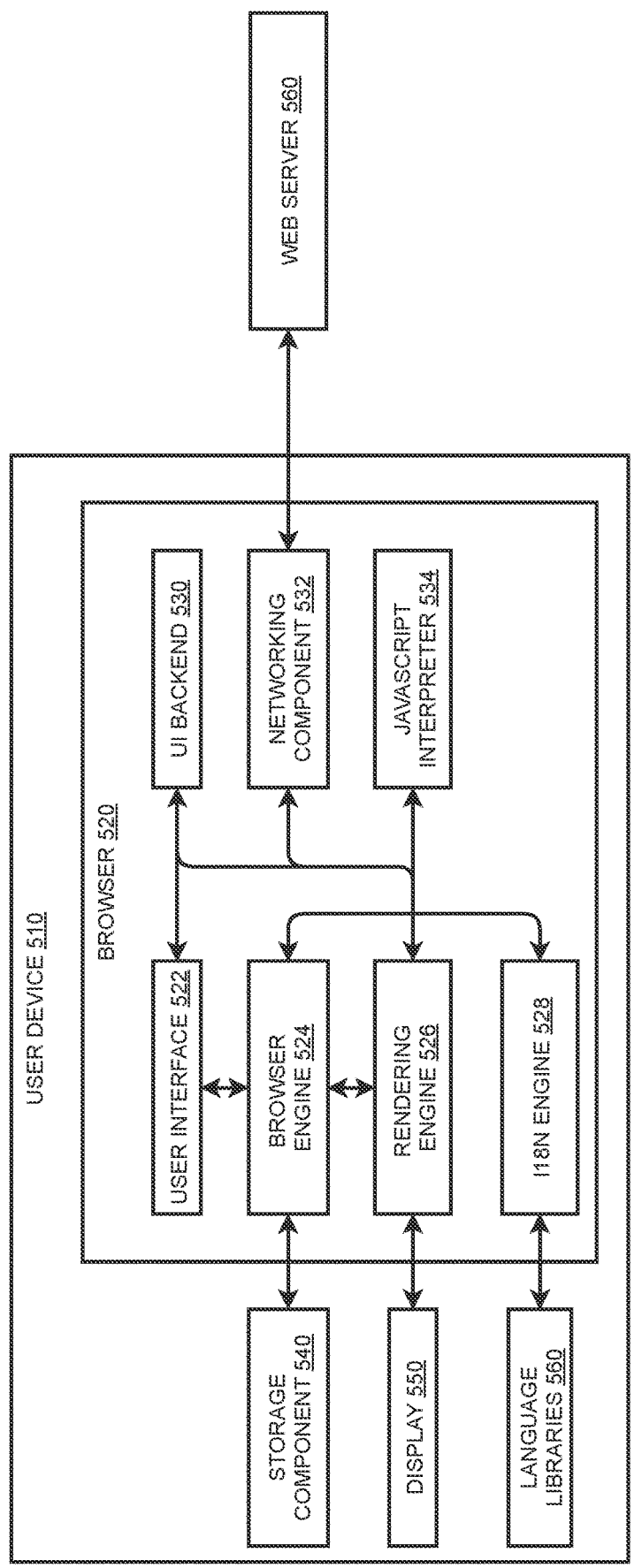
FIG. 5 is an illustration of a system for providing language content in an application.

FIG. 5 is an illustration of a system for providing language content in an application. The system can include a user device 510. The user device can include a browser 520. The browser 520 can include a UI 522. The UI 522 can provide portions of a browser display aside from the main window where content is displayed. This can include items such as the address bar, bookmarking menu, refresh button, browser extensions, and back/forward buttons. The UI 522 communicate with a UI backend 530 that drives the UI 522 and provides widgets, such as combo boxes and windows.

The web browser can include a rendering engine 526 that handles displaying content on a display 550. For example, when the web browser receives an HTML document, the rendering engine 526 can parse HTML, CSS, and JavaScript in the document and create a DOM. The DOM can be stored in a storage component 540. The storage component 540 can be a storage medium where data is stored temporarily, such as memory. In one example, the storage component can be included as part of the bowser 520. The rendering engine 526 can communicate with the UI 522 to display the content from the DOM on the display 550. As a user interacts with the web page, a browser engine 524 can marshal actions between the rendering engine 526 and the UI 522.

The browser engine 524 can also be responsible for handling other interactions between various components. For example, the browser engine 524 can store the DOM in the storage component 540 after it is created by the rendering engine 526. The browser engine 524 can also be responsible for event management. For example, when the rendering engine 526 publishes that the DOM is created or that it updated the DOM, or when the i18n engine 528 publishes that language content has been inserted into the DOM, the browser engine 524 can handle notifying subscribed components.

The rendering engine 526 can include a JavaScript interpreter 534 that parses and executes JavaScript code from HTML codes. The rendering engine 526 can also communicate with a networking component 532 that handles network calls like HTTP requests. As an, a user can perform an action for requesting a web page. For example, a user can click on a link or insert a URL into an address bar of the browser 520. The networking component 532 can send the request as an HTTP request to a web server 560. The web server 560 can respond with a HTML document corresponding to the URL. The networking component 532 can facilitate receiving the HTML document for the browser 520.

The i18n 528 engine can be responsible for managing language content. For example, using methods described herein, the i18n engine 528 can handle formatting language content and inserting language content into the DOM based on language markers. The i18n engine 528 can communicate with language libraries 560. The language libraries 560 can localization content for a web site or application. Examples of localization content can include language content and target locale settings. In one example, each language library 560 can store localization content for a different language. In another example, the storage libraries 560 can be part of the storage component 540. In an example, localization content can be received from the web server 560 with the HTML document. The localization content can include language content and locale settings for the requested web page. The localization content can be stored in the language libraries where it can be retrieved by the i18n engine for loading into the DOM.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for providing language content in an application, comprising:
   receiving a markup file that includes information for displaying content, the markup file including a language marker;
   constructing a Document Object Model ("DOM") from the markup file, wherein an object of the DOM includes the language marker, wherein the DOM is created without the language content in place of the language marker, and a web browser uses the DOM to render a webpage without the language content;
   determining a target locale setting of the application, the target locale setting including a language for displaying content;
   retrieving the language content in the determined language that corresponds to the language marker, wherein the language marker includes an identifier that is mapped against a language library to retrieve the language content associated with the identifier, wherein the language library is selected from a plurality of language libraries based on the language of the target locale;
   inserting the retrieved language content into the object of the DOM, wherein the DOM is updated multiple times for multiple different languages, wherein at least one of the updates includes a change to the language marker; and
   based on detecting the language marker updates to the DOM, producing different renderings of the multiple different languages.

2. The method of claim 1, further comprising:
   receiving a notification of a modification to the DOM;
   determining that the language marker in the object has been modified; and
   inserting new language content into the object.

3. The method of claim 1, further comprising:
   receiving a selection of a different language than the determined language as part of testing internationalization of the application;
   identifying language content in the different language that corresponds to the language marker; and
   replacing the language content in the object with the language content of the different language.

4. The method of claim 1, wherein the markup file is one selected from the group consisting of: a Hypertext Markup Language file, an Extensible Hypertext Markup Language file, an Extensible Markup Language file, and a configuration file.

5. The method of claim 1, wherein the retrieving stage includes comparing the language marker to a locally stored mapping table that maps language markers to language content in the determined language.

6. The method of claim 1, further comprising:
   identifying an error created by the language content being inserted into the DOM; and
   providing a notification of the error.

7. A non-transitory, computer-readable medium containing instructions that, when executed by a hardware-based processor, performs stages for providing language content in an application, the stages comprising:
   receiving a markup file that includes information for displaying content, the markup file including a language marker;
   constructing a Document Object Model ("DOM") from the markup file, wherein an object of the DOM includes the language marker, wherein the DOM is created without the language content in place of the language marker, and a web browser uses the DOM to render a webpage without the language content;
   determining a target locale setting of the application, the target locale setting including a language for displaying content;
   retrieving the language content in the determined language that corresponds to the language marker, wherein the language marker includes an identifier that is mapped against a language library to retrieve the language content associated with the identifier, wherein the language library is selected from a plurality of language libraries based on the language of the target locale;
   inserting the retrieved language content into the object of the DOM, wherein the DOM is updated multiple times for multiple different languages, wherein at least one of the updates includes a change to the language marker; and
   based on detecting the language marker updates to the DOM, producing different renderings of the multiple different languages.

8. The non-transitory, computer-readable medium of claim 7, the stages further comprising:
   receiving a notification of a modification to the DOM;
   determining that the language marker in the object has been modified; and
   inserting new language content into the modified object.

9. The non-transitory, computer-readable medium of claim 7, the stages further comprising:
   receiving a selection of a different language than the determined language as part of testing internationalization of the application;
   identifying language content in the different language that corresponds to the language marker; and
   replacing the language content in the object with the language content of the different language.

10. The non-transitory, computer-readable medium of claim 7, wherein the markup file is one selected from the group consisting of: a Hypertext Markup Language file, an Extensible Hypertext Markup Language file, an Extensible Markup Language file, and a configuration file.

11. The non-transitory, computer-readable medium of claim 7, wherein the retrieving stage includes comparing the language marker to a locally stored mapping table that maps language markers to language content in the determined language.

12. The non-transitory, computer-readable medium of claim 7, the stages further comprising:
   identifying an error created by the language content being inserted into the DOM; and
   providing a notification of the error.

13. A system for providing language content in an application, comprising:
   a memory storage including a non-transitory, computer-readable medium comprising instructions; and
   a computing device including a hardware-based processor that executes the instructions to carry out stages comprising:

receiving a markup file that includes information for displaying content, the markup file including a language marker;

constructing a Document Object Model ("DOM") from the markup file, wherein an object of the DOM includes the language marker, wherein the DOM is created without the language content in place of the language marker, and a web browser uses the DOM to render a webpage without the language content;

determining a target locale setting of the application, the target locale setting including a language for displaying content;

retrieving the language content in the determined language that corresponds to the language marker, wherein the language marker includes an identifier that is mapped against a language library to retrieve the language content associated with the identifier, wherein the language library is selected from a plurality of language libraries based on the language of the target locale;

inserting the retrieved language content into the object of the DOM, wherein the DOM is updated multiple times for multiple different languages, wherein at least one of the updates includes a change to the language marker; and based on detecting the language marker updates to the DOM, producing different renderings of the multiple different languages.

14. The system of claim 13, the stages further comprising:
receiving a notification of a modification to the DOM;
determining that the language marker in the object has been modified; and
inserting new language content into the modified object.

15. The system of claim 13, the stages further comprising:
receiving a selection of a different language than the determined language;
identifying language content in the different language that corresponds to the language marker; and
replacing the language content in the object with the language content of the different language.

16. The system of claim 13, wherein the markup file is one selected from the group consisting of: a Hypertext Markup Language file, an Extensible Hypertext Markup Language file, an Extensible Markup Language file, and a configuration file.

17. The system of claim 13, wherein the retrieving stage includes comparing the language marker to a locally stored mapping table that maps language markers to language content in the determined language.

18. The system of claim 13, the stages further comprising:
identifying an error created by the language content being inserted into the DOM; and
providing a notification of the error.

* * * * *